July 4, 1944.  H. F. BAUKNECHT  2,352,758
AIRCRAFT INCLINATION INDICATOR
Filed July 13, 1943   2 Sheets-Sheet 1

INVENTOR,
Harry F. Bauknecht
BY
Victor J. Evans & Co.
ATTORNEYS

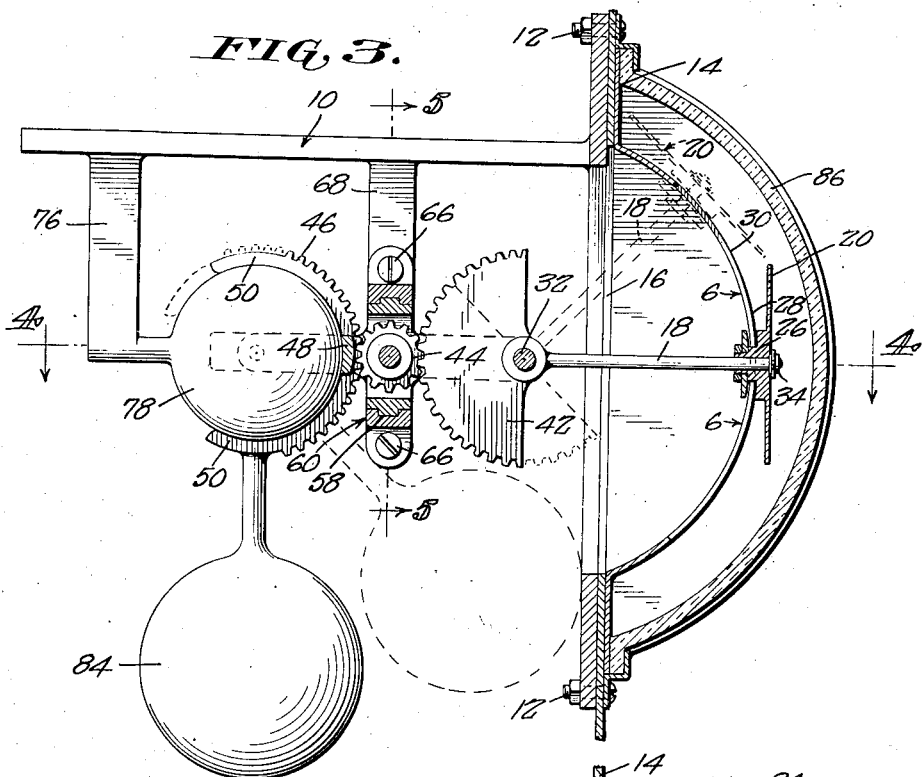
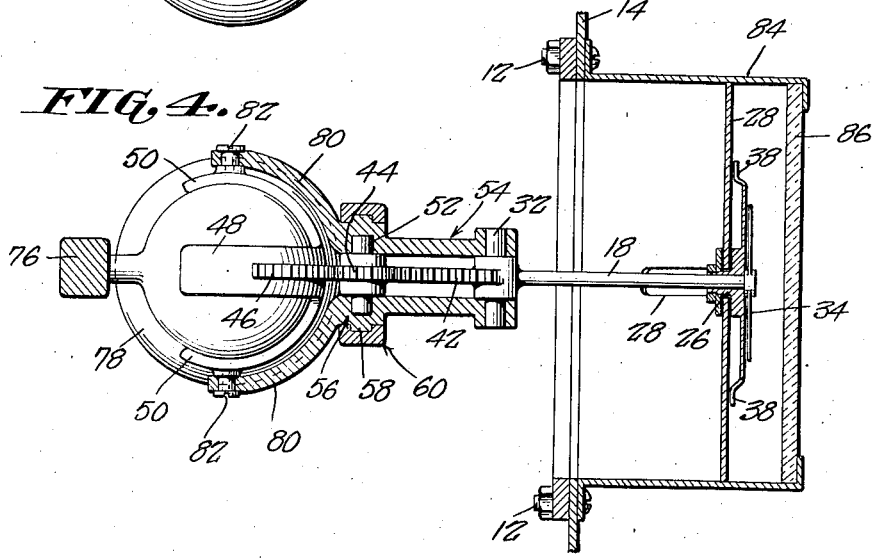

Patented July 4, 1944

2,352,758

UNITED STATES PATENT OFFICE 2,352,758

AIRCRAFT INCLINATION INDICATOR

Harry F. Bauknecht, Ridgewood, N. J.

Application July 13, 1943, Serial No. 494,536

5 Claims. (Cl. 33—215)

My invention relates to aircraft, and has among its objects and advantages the provision of an improved instrument for indicating deviation from the horizontal in flight, as when banking, ascending or descending.

In the accompanying drawings:

Figure 3 is a view taken along the line 3—3 of Figure 1.

Figure 4 is a view taken along the line 4—4 of Figure 3.

Figure 1:
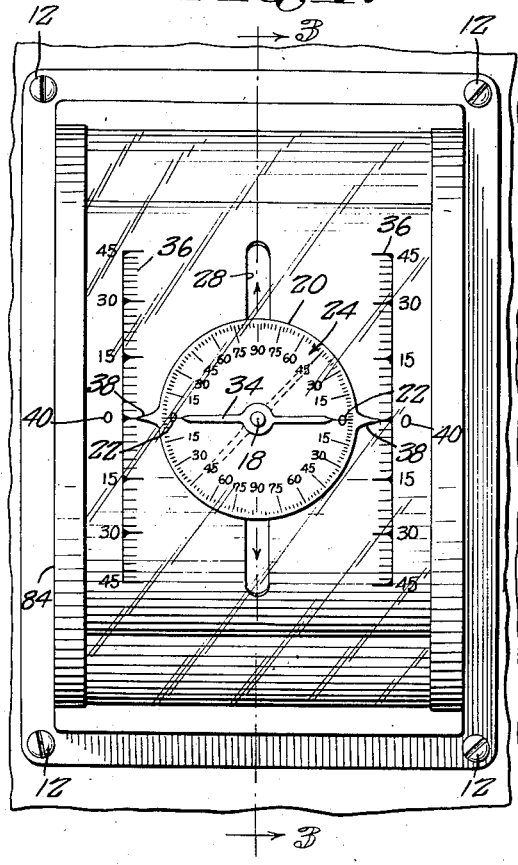
Figure 1 is a face view.
Figure 2:
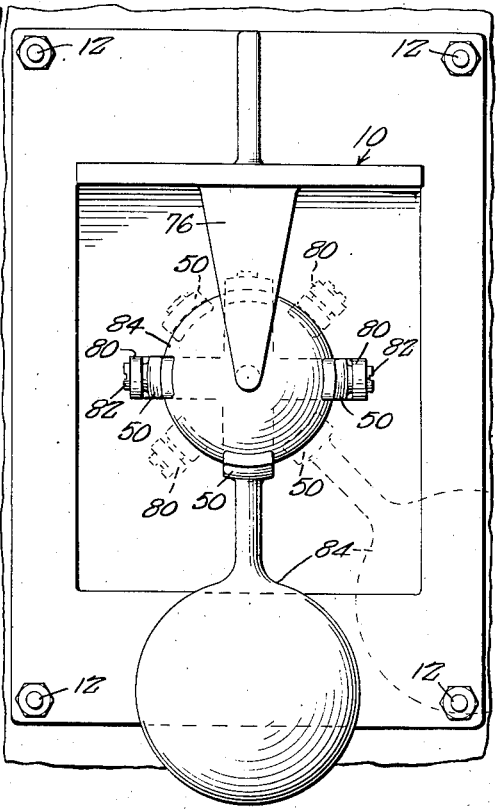
Figure 2 is a rear view.
Figure 5:
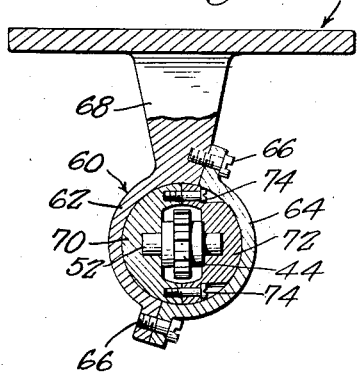
Figure 5 is a sectional view taken along the line 5—5 of Figure 3.
Figure 6:
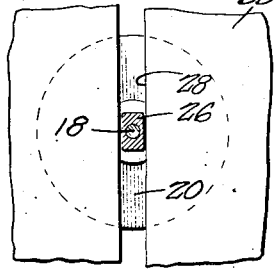
Figure 6 is a view taken from the position indicated by line 6—6 of Figure 3.

In the embodiment of the invention selected for illustration, I make use of a frame 10 which is bolted at 12 to a supporting panel 14. This panel is provided with a vertical slot 16 for loosely receiving an arm 18 to one end of which is mounted a circular dial 20 having two diametrically opposed zero positions 22 and a scale 24 reading from 0 to 90 in values of degrees in both directions from each zero position.

The dial 20 includes a rectangular body 26 which slides freely in a vertical slot 28 in a bowed plate 30 fixed to the plate 14. The slot 28 is aligned with the slot 16 so that the body 26 may move freely in the slot 28 through oscillation of the arm 18 about its pivot or supporting shaft 32. The plate 30 is bent concentrically of the shaft 32, and the arm 18 is rotatably supported in the body 26 and is provided with coaxial pointers 34 lying close to the scale 24 on the dial 20.

Rotation of the arm 18 moves the pointers 34 relatively to the scale 24 for indicating deviation from the horizontal, as when banking the aircraft, while movement of the dial 20 along the slot 28 indicates deviation when in either a decline or incline.

Two identical scales 36 are provided on the face of the plate 30 for coaction with pointers 38 projecting beyond the perimeter of the dial in opposite but coaxial directions. When in horizontal flight, the pointers 38 register with the zero positions 40 on the scales 36.

Means for actuating the arm 18 with respect to its oscillatory motion and rotation relatively to the body 26 comprises a segmental gear 42 fixed to the arm 18 and meshing with a pinion 44. This pinion meshes with a segmental gear 46 fixed to one of two cross arms 48 and 50. The shaft 32 and a shaft 52, which supports the pinion 44, are rotatably supported in a gear frame 54 having an annular body 56 provided with an annular rib 58 which is rotatably supported in a correspondingly grooved guide ring 60.

The guide ring 60 comprises sections 62 and 64 detachably connected by bolts 66. An arm 68 is attached to the sections 62 and is fixedly connected with the frame 10. The body 56 also comprises sections 70 and 72 connected together by bolts 74. The sections 70 and 72 divide in the plane of the pinion 44.

The frame 10 includes a depending arm 76 to which a ball 78 is fixedly attached. Both arms 48 and 50 are curved to guidingly embrace the ball 78 and curved about the latter throughout arcs exceeding 180 degrees. Two curved arms 80 are formed on the gear frame 54, and the two arms 50 are pivotally connected at 82 with the two arms 80. The connections 82 are coaxial and are arranged at right angles to a line extending through the axes of the two shafts 32 and 52, with the center of the ball 78 registering with this line. The two arms 48 and 50 are connected as a unit, and a weight or pendulum 84 is fixed to and depends from the lowermost end of the arm 48.

In operation, the weight 84 gravitates to a vertical position when the aircraft ascends or descends. Such movement of the weight imparts rotation to the gear 44, which in turn rotates the gear 42 and imparts pivotal movement to the arm 18 for shifting the dial 20 relatively to the plate 30, so that the degree of inclination may be readily determined by noting the position of either pointer 38 with respect to its scale 36. Any deviation of the aircraft from the horizontal, as when banking, causes the ring 60 to rotate relatively to the gear frame 54 so that the pointers 34 will remain horizontally but the dial 20 will rotate with the plate 30 so that the inclination may be determined by noting the position of the pointers 34 with respect to the scale 24. The arms 48 and 50 rotate easily on the ball 78, and the weight 84 is sufficiently heavy to actuate the three gears 42, 44 and 46 or to permit the ring 60 to turn easily on the gear frame. The body 26 is restrained from rotation in the slot 28, but the body moves easily longitudinally of the slot. The two dials 20 and 30 are enclosed in a housing 84 having a transparent face 86.

Without further elaboration, the foregoing will so fully explain my invention, that others may, by applying current knowledge, readily adapt the same for use under various conditions of service.

I claim:

1. An instrument for indicating deviation of an aircraft from the horizontal comprising a support fixed to the aircraft, a first dial fixedly related to the support and having a vertical slot and a first scale thereon, a second dial having a body slidable in said slot and provided with a second scale, a pivoted arm rotatably supported in said body and having a first pointer coacting with said second scale, said second dial having a pointer coacting with said first scale, a gear fixed to said arm for oscillating the latter longitudinally of said slot, a pendulum gear means operatively connected with said first gear to impart rotation thereto when the plane is in an incline or decline to shift said second dial and its pointer relatively to said first scale, and means rotatably supporting said first gear and said pendulum gear means for rotation about an axis at right angles to the axis of said arm to rotate the arm and said first pointer relatively to said second scale to indicate inclination of the aircraft when in a bank.

2. The invention described in claim 1 wherein said means include a bearing fixed to the aircraft, and a gear frame rotatably mounted in the bearing.

3. The invention described in claim 1 wherein said pendulum gear means includes a second gear and a third gear meshing with said second gear and said first mentioned gear, a ball fixed to said aircraft, and curved fingers fixedly related one to the other and to said second gear and rotatably embracing the ball.

4. The invention described in claim 1 wherein said pendulum gear means includes a second gear and a pinion placing the second gear in mesh with said first mentioned gear, a gear frame rotatably supporting said first mentioned gear and said pinion, a ball fixedly related to the aircraft, curved means fixedly related to said second gear and guidably engaging said ball, and a pivotal connection between said gear frame and said curved means.

5. The invention described in claim 1 wherein said first dial is curved about the axis of said arm, with said arm pivoting about a horizontal axis, and in which there is provided a universal bearing for supporting said pendulum gear means.

HARRY F. BAUKNECHT.